(12) United States Patent
Moore et al.

(10) Patent No.: US 8,821,118 B2
(45) Date of Patent: Sep. 2, 2014

(54) OPTIMIZATION OF DOWNSTREAM OPEN FAN PROPELLER POSITION

(75) Inventors: Matthew D. Moore, Everett, WA (US);
Kelly L. Boren, Marysville, WA (US);
Robin B. Langtry, Burien, WA (US)

(73) Assignee: The Boeing Company, Chicago, IL (US)

( * ) Notice: Subject to any disclaimer, the term of this patent is extended or adjusted under 35 U.S.C. 154(b) by 1257 days.

(21) Appl. No.: 12/643,554

(22) Filed: Dec. 21, 2009

(65) Prior Publication Data

US 2011/0150645 A1 Jun. 23, 2011

(51) Int. Cl.
| | |
|---|---|
| *F01D 25/04* | (2006.01) |
| *B64C 11/48* | (2006.01) |
| *B64C 11/00* | (2006.01) |
| *B64D 27/02* | (2006.01) |

(52) U.S. Cl.
CPC ......... *B64C 11/003* (2013.01); *B64D 2027/026* (2013.01); *B64C 11/48* (2013.01)
USPC .............................................. 416/1; 416/129

(58) Field of Classification Search
USPC ........... 416/1, 128, 129, 132 R, 131, 141, 87, 416/88, 89
See application file for complete search history.

(56) References Cited

U.S. PATENT DOCUMENTS

| | | | |
|---|---|---|---|
| 2,979,288 A | 11/1961 | Klein | |
| 4,142,697 A | 3/1979 | Fradenburgh | |
| 5,253,979 A | 10/1993 | Fradenburgh et al. | |
| 5,743,489 A | 4/1998 | Stemme | |
| 6,030,177 A | 2/2000 | Hager | |
| 7,004,427 B2 | 2/2006 | Gerbino | |
| 2004/0144892 A1 | 7/2004 | Gerbino | |
| 2010/0206982 A1 | 8/2010 | Moore et al. | |

FOREIGN PATENT DOCUMENTS

| | | |
|---|---|---|
| DE | 1506623 A1 | 7/1969 |
| WO | 2008096124 A2 | 8/2008 |

OTHER PUBLICATIONS

Magliozzi, "Noise Characteristics of Model Counter-Rotating Prop-Fans", Oct. 19, 1987, AIAA 11th Aeroacoustics Conference, Sunnyvale, CA., pp. 1-13.
PCT International Search Report, May 31, 2011, PCT/US2010/057275, filed Nov. 18, 2010.
Moore et al., "Optimization of Downstream Open Fan Propeller Position and Placement of Acoustic Sensors," U.S. Appl. No. 14/079,550, filed Nov. 13, 2013, 78 pages.
Chatterjee, "Emissions caps seen costing airlines $7 billion a year," Jun. 9, 2009, Reuters, pp. 1-2. http://www.reuters.com/article/2009/06/09/us-airlines-carbon-idUSTRE55718G20090609.
"Lufthansa hits Night Ban", Feb. 18, 2009, Journal of Commerce, pp. 1-2, https://www.joc.com/air-cargo/lufthansa-hits-night0ban_20090217, accessed Dec. 4, 2013.
"Low Frequency Noise Study," PARTNER, pp. 1-2, http://partner.mit.edu/projects/low-frequency-noise-study, accessed Dec. 4, 2013.

Primary Examiner — Dwayne J White
(74) Attorney, Agent, or Firm — Yee & Associates, P.C.

(57) ABSTRACT

A method and apparatus for controlling a propeller of a contra-rotation open fan (CROF) engine of an aircraft. A diameter of the propeller is set to be at a first diameter during at least a portion of a first flight condition of the aircraft. The diameter of the propeller is set to be at a second diameter, different from the first diameter, during at least a portion of a second flight condition of the aircraft.

24 Claims, 18 Drawing Sheets

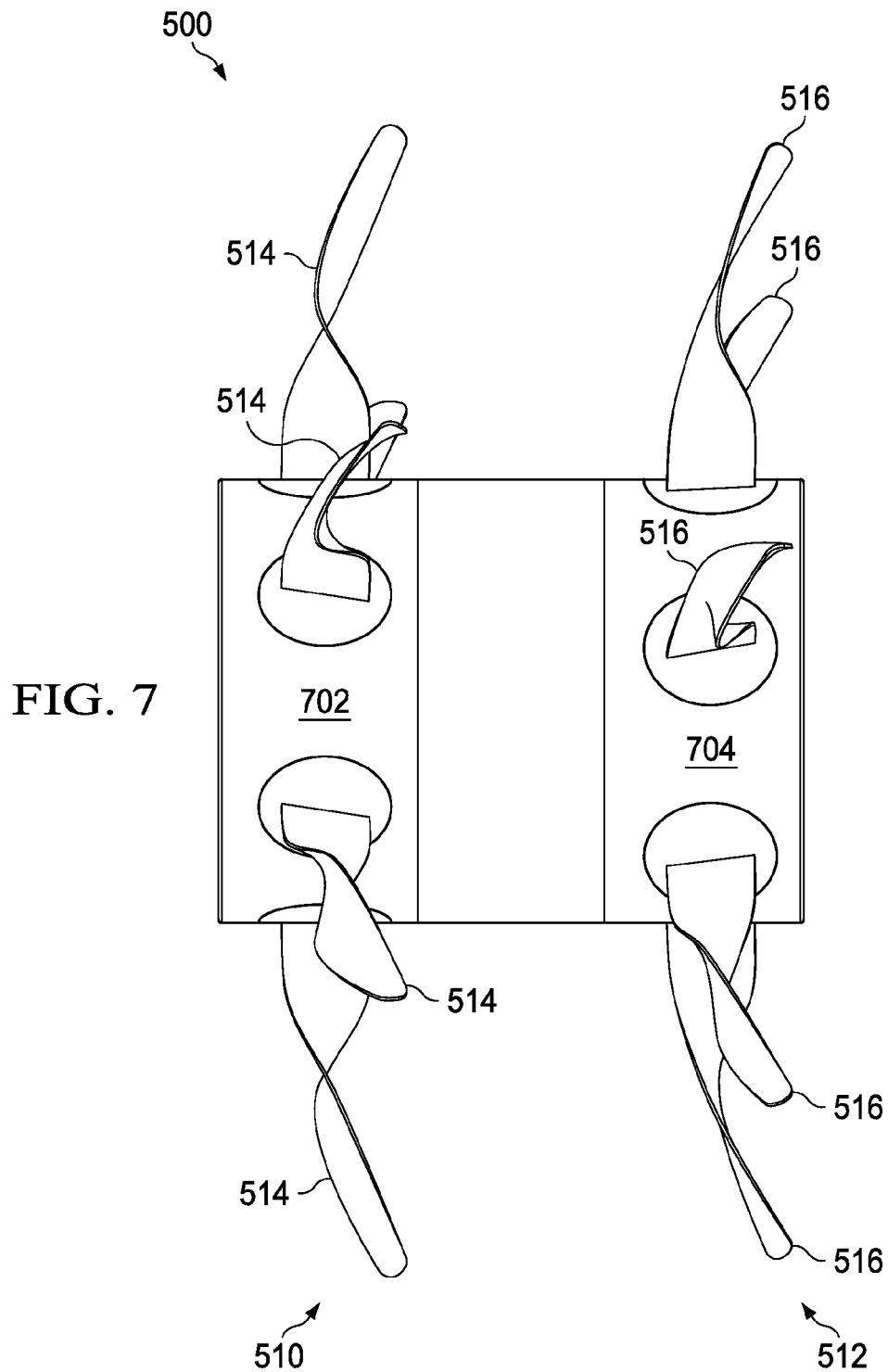

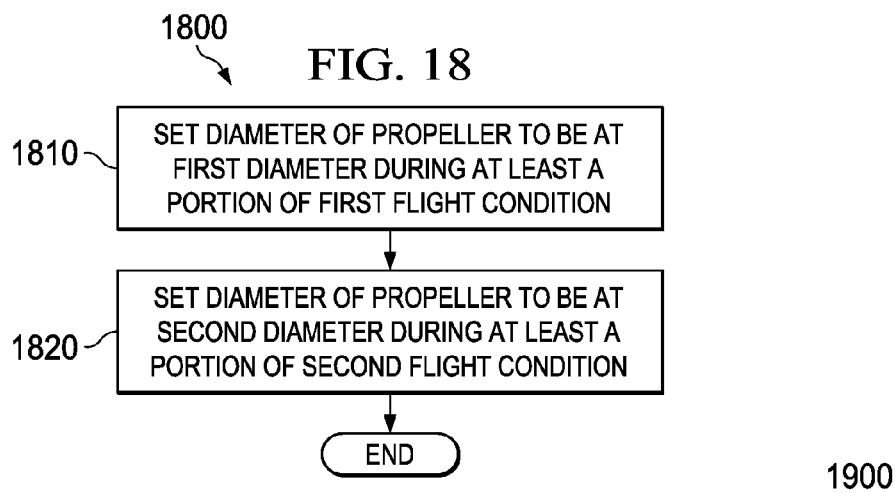
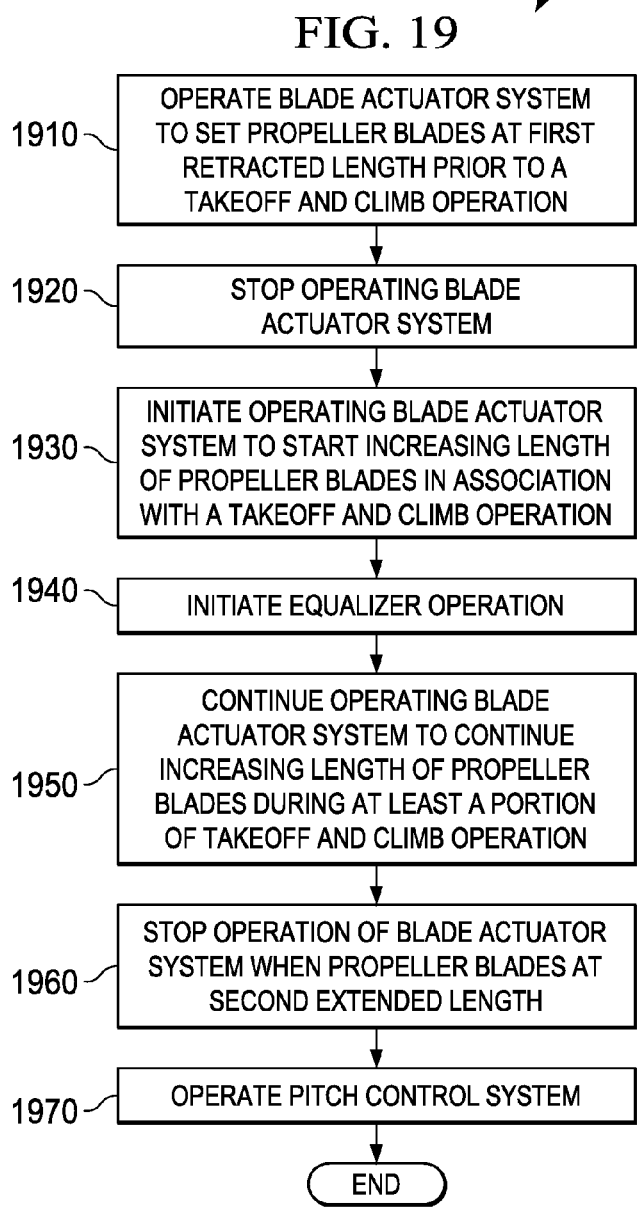

OPTIMIZATION OF DOWNSTREAM OPEN FAN PROPELLER POSITION

BACKGROUND INFORMATION

1. Field

The present disclosure relates generally to propulsion systems, such as aircraft propulsion systems and, in particular, to a method and apparatus for an aircraft propulsion system. Still more particularly, the present disclosure relates to a method and apparatus for optimizing the position of a downstream propeller of a contra-rotation open fan engine.

2. Background

Current contra-rotation open fan (CROF) propeller systems for CROF aircraft engines require some degree of "cropping" of the blades of the downstream propeller in order to reduce takeoff community noise due to natural contraction of the stream tube beyond the upstream propeller. Current legal noise limits and local airport noise regulations may require cropping of the blades by an amount sufficient to reduce the diameter of the downstream propeller by twenty percent or more to meet noise requirements.

Cropping, however, decreases the effective span, and thus lift for a given pitch of the downstream propeller, and requires an increase in pitch to recover lost thrust to meet take-off thrust requirements. In some cases, it is not possible to meet the un-cropped thrust. The increased pitch, however, may result in increased drag and a degradation of off design (take-off, climb, descent, reverse are all off-design) performance that can also increase wake-related self-noise of the cropped propeller.

The unacceptable noise levels encountered during takeoff by an aircraft having one or more CROF engines is driven by wake interaction and Blade Vortex Interaction (BVI) noise. BVI noise is caused by the fact that tip vortices created by the upstream propeller tend to decay in a radial inward direction toward the downstream propeller as the stream tube contracts (the contraction angles are a function of flight Mach number and aircraft angle) in such a way that the vortices are "chopped" (interacted with) by the downstream propeller at generally the most highly loaded region of the downstream propeller blades. As the downstream propeller chops these vortices, inherent blade-passage tone levels increase and new interaction tones are created. In addition, un-steady blade stress is aggravated, which may cause a need for propeller reinforcement, and additional engine vibration reinforcement/treatment resulting in increased weight and cost. Often, a thicker propeller airfoil than would be preferred for optimum performance is required for reinforcing strength, which increases wave drag that degrades propeller performance and creates noise.

The noise penalty relative to a downstream propeller that is "cropped" may be up to 6EPN (Effective Perceived Noise) dB (cumulative to the three current certification measurement point rules). While the tips of the downstream propeller blades are not always literally "cropped" (i.e., cut), a downstream propeller having a shorter diameter than the upstream propeller is generally referred to by those skilled in the art as being "cropped".

Reducing the diameter of the downstream propeller of a CROF propeller system of a CROF aircraft engine holds to the same aerodynamic principles as reducing the effective wing-span of the aircraft, and results in a direct reduction in aerodynamic efficiency, which for a CROF engine can be as much as five percent cruise SFC (Specific Fuel Consumption). The typical airplane level Block Fuel penalty, encompassing the varying penalties of the overall mission segments (take-off, climb, cruise, descent) is typically slightly (1-2 percent) worse than the stated SFC penalty. Unfortunately, this fuel burn penalty is generally accepted for an entire mission even though the noise-sensitive portion of the takeoff segment may only last several minutes.

Furthermore, an airplane life cycle can be 20-30 years and, during this lifetime, legal noise certification standards as well as local airport regulations typically increase in stringency. In order to avoid costly modifications early in the airplane and engine product life-cycles, these factors can drive even greater aggressiveness in engine performance compromises to ensure the current vehicle design can meet possible future noise requirements at the time the customer takes delivery.

One proposed approach to solving the CROF noise problem is to drastically alter the aircraft general arrangement and configuration to shield/contain the noise produced by the propeller system. For an equivalent class of payload-range requirements, however, this type of solution generally involves unacceptable penalties including increased TAROC (total airplane related operating costs) due to increased airplane mass (OEW) per unit payload, degraded drag due to increased wetted area and center of gravity trim, and an additional engine specific fuel consumption penalty related to how the engine is installed in the presence of the airframe, wing, and control surfaces. In addition, these alternative options often result in an unacceptable engine-to-engine proximity for fratricide avoidance, airplane load-ability, and an engine location that becomes inaccessible for maintenance and service.

Therefore, it would be advantageous to have a method and apparatus that takes into account one or more of the issues discussed above, as well as possibly other issues.

SUMMARY

In one advantageous embodiment, a method is present for controlling a propeller of a contra-rotation open fan (CROF) engine of an aircraft. A diameter of the propeller is set to be at a first diameter during at least a portion of a first flight condition of the aircraft. The diameter of the propeller is set to be at a second diameter, different from the first diameter, during at least a portion of a second flight condition of the aircraft.

In another advantageous embodiment, an apparatus comprises a contra-rotation open fan (CROF) engine having a plurality of propellers; and an actuator. The actuator is for setting a diameter of a propeller of the plurality of propellers at a first diameter during at least a portion of a first flight condition of an aircraft. The actuator is for setting the diameter of the propeller to be at a second diameter, different from the first diameter, during at least a portion of a second flight condition of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, and further objectives and advantages thereof, will best be understood by reference to the following detailed description of an advantageous embodiment of the present disclosure when read in conjunction with the accompanying drawings, wherein:

FIG. 7 is an illustration of a side perspective view of a propeller system of the contra-rotation open fan engine illustrated in FIG. 5 in accordance with an advantageous embodiment;

FIG. 18 is an illustration of a flowchart that depicts a process for controlling a propeller in an aircraft engine of an aircraft in accordance with an advantageous embodiment; and FIG. 19 is an illustration of a flowchart that depicts a process for controlling a propeller in an aircraft engine of an aircraft in accordance with an advantageous embodiment.

DETAILED DESCRIPTION

Figure 1:
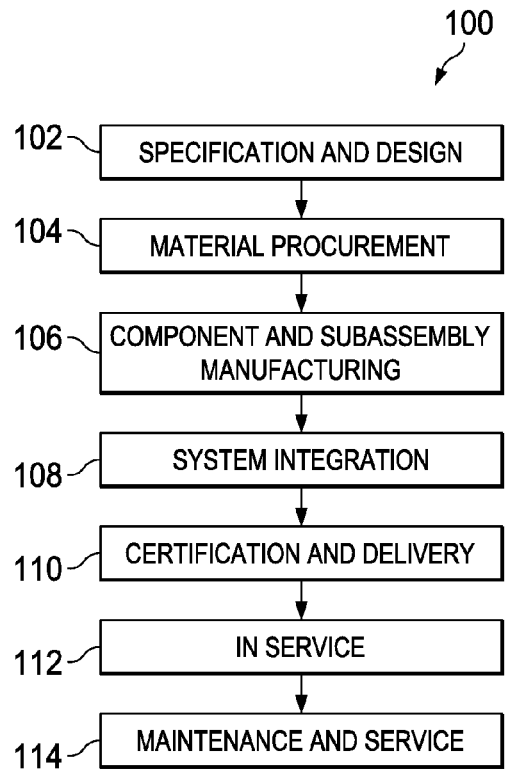
FIG. 1 is an illustration of an aircraft manufacturing and service method in accordance with an advantageous embodiment.
Figure 2:
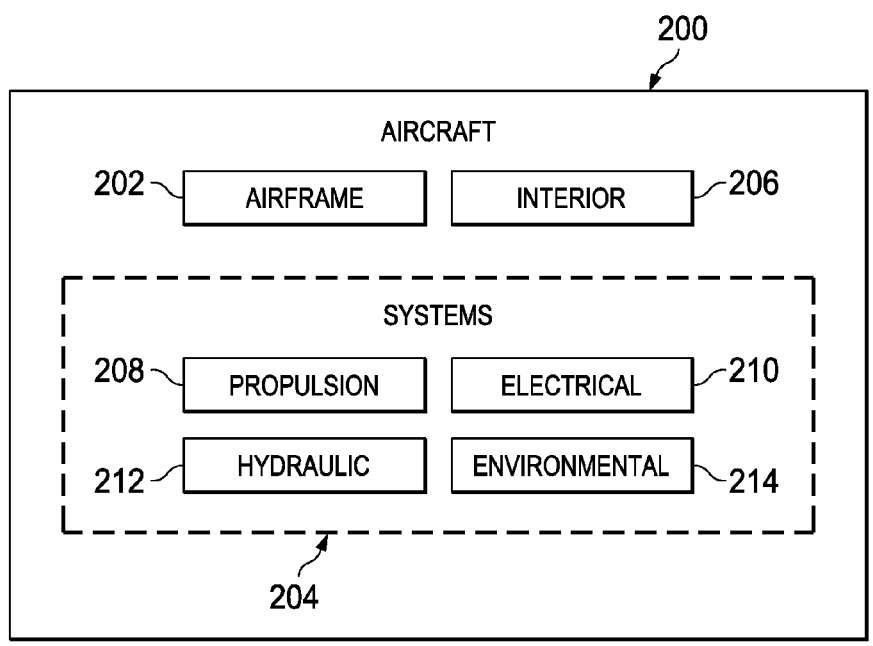
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification testing and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212 and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

Figure 3:
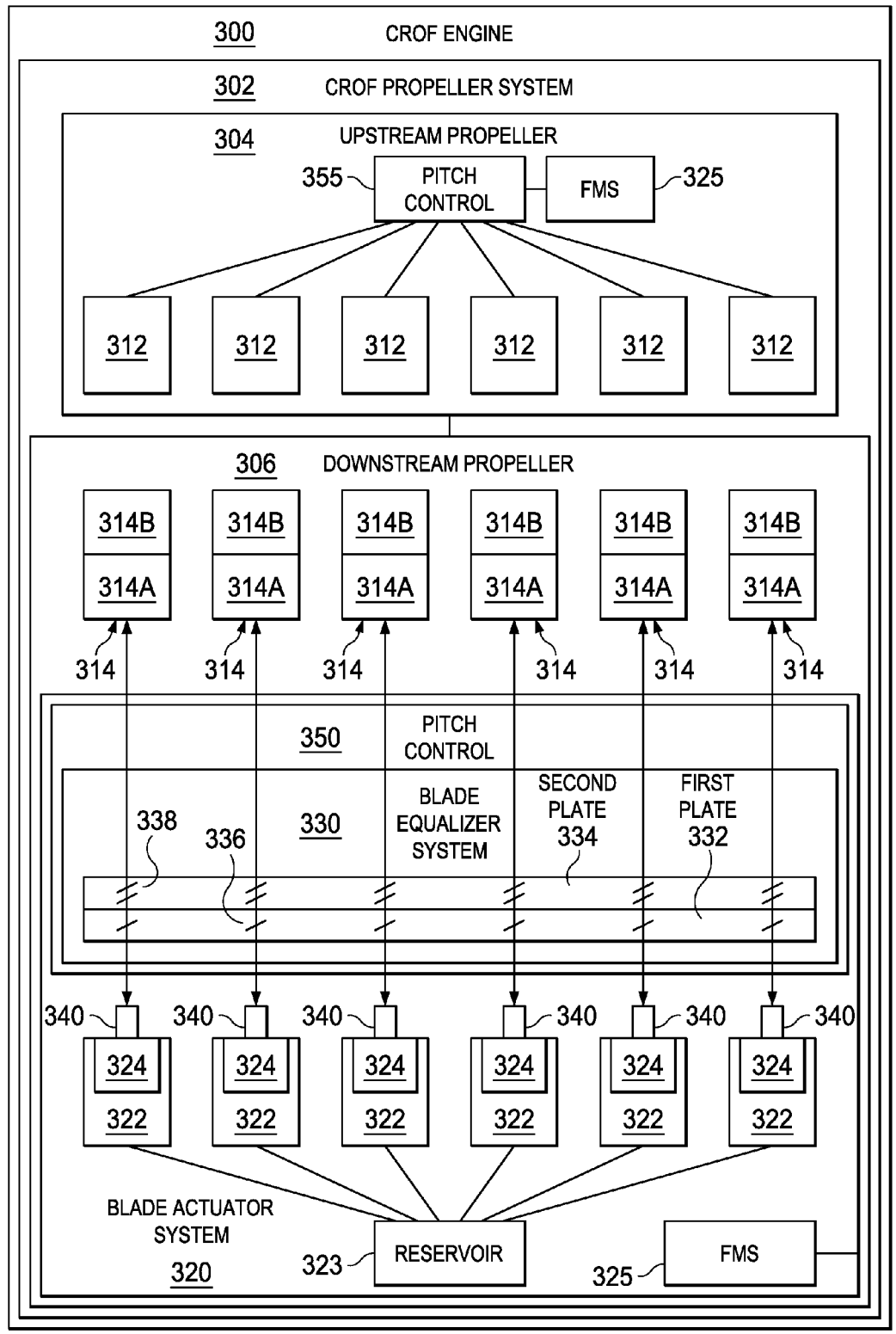
FIG. 3 is an illustration of a block diagram of an engine for an aircraft in accordance with an advantageous embodiment.

Turning now to FIG. 3, an illustration of a block diagram of an engine for an aircraft is depicted in accordance with an advantageous embodiment. The engine is generally designated by reference number 300, and in the advantageous embodiment described herein may be a contra-rotation open fan (CROF) engine. CROF engine 300 may be implemented in propulsion system 208 illustrated in FIG. 2. CROF engine 300 has a CROF propeller system 302 which may include an upstream propeller 304 and a downstream propeller 306.

Upstream propeller 304 has a plurality of upstream propeller blades 312, and downstream propeller 306 has a plurality of downstream propeller blades 314. In the advantageous embodiment illustrated in FIG. 3, upstream propeller 304 and downstream propeller 306 each have six propeller blades. It should be understood, however, that this is exemplary only as the propellers may have any desired number of propeller blades and it is not intended to limit advantageous embodiments to propellers having any particular number of propeller blades.

Upstream propeller blades 312 may have a fixed length, i.e., a fixed blade span, to provide an upstream propeller 304 having a fixed diameter. For example and without limitation, upstream propeller blades 312 may have a fixed length to form an upstream propeller 304 having a fixed diameter of from about 12 feet (144 inches) to about 14 feet (168 inches). Downstream propeller blades 314, however, may have a variable length/blade span to form a downstream propeller having a variable diameter. In particular, downstream propeller blades 314 may be varied in length from between a first retracted length 314A and a second extended length 314B. When the downstream propeller blades are at the first retracted length 314A, downstream propeller may, for example and without limitation, have a diameter that is from about five percent to about twenty percent less than the fixed diameter of the upstream propeller 304; and when the downstream propeller blades are at the second extended length 314B, downstream propeller 306 may have a diameter that is substantially equal to the fixed diameter of the upstream propeller 304.

Downstream propeller 306 also has a blade actuator system 320 for controlling the length of the downstream propeller blades 314. Blade actuator system 320 may have a plurality of blade actuators 322, each of which controls the length of one of the downstream propeller blades 314. In the advantageous embodiment described herein, blade actuators 322 are hydraulic actuators which control the length of one of the downstream propeller blades 314 from between the first retracted length 314A and the second extended length 314B; however, it should be understood that this is intended to be exemplary only as blade actuator system 320 may take other forms and the blade actuators 322 may be powered in different ways.

In accordance with an advantageous embodiment, blade actuators 322 may be powered by pressurized hydraulic fluid from a common reservoir 323 to help ensure that the blade actuators operate in unison such that the plurality of downstream propeller blades are moved in unison and are always of the same length to avoid rotating imbalance.

Operation of the actuator system 320 may be controlled by a Flight Management System (FMS) 325 of the aircraft as shown in FIG. 3.

In order to further ensure that the downstream propeller blades are moved in unison and are always of the same length, blade actuator system 320 may include a blade equalizer system 330. Blade equalizer system 330 is a trailing mechanism, not a driving mechanism, and functions as a redundancy system to prevent blade imbalance. Blade equalizer system 330 may have a first plate 332, which may be incorporated in a housing for the downstream propeller, and a second plate 334, which may be a cover for the downstream propeller housing and which is rigidly secured to the first plate. First plate 332 may have a plurality of radial slots 336 therein and second plate 334 may have a plurality of spiral curved slots 338 therein. A pin 340 may be attached to a moveable member 324 of each blade actuator 322, which may be driven in and out by hydraulic fluid from reservoir 323, and extends through respective aligned slots 336 and 338 in the first and second plates 332 and 334. The aligned slots 336 and 338 in the first and second plates 332 and 334 to ensure that the pins 340 of each blade actuator are always at the same position in their respective slots and, hence, that the moveable members 324 are always moved in unison, and that the downstream propeller blades 314 attached to the moveable members 324 are always moved in unison and will always be of the same length.

Blade actuator system 320 may include a pitch control system 350 for adjusting the pitch of the downstream propeller blades 314, and upstream propeller 304 may also include a pitch control system 355 for adjusting the pitch of upstream propeller blades 312. The pitch of the propeller blades of the upstream and downstream propellers 304 and 306 may be controlled by FMS 325.

Figure 4:
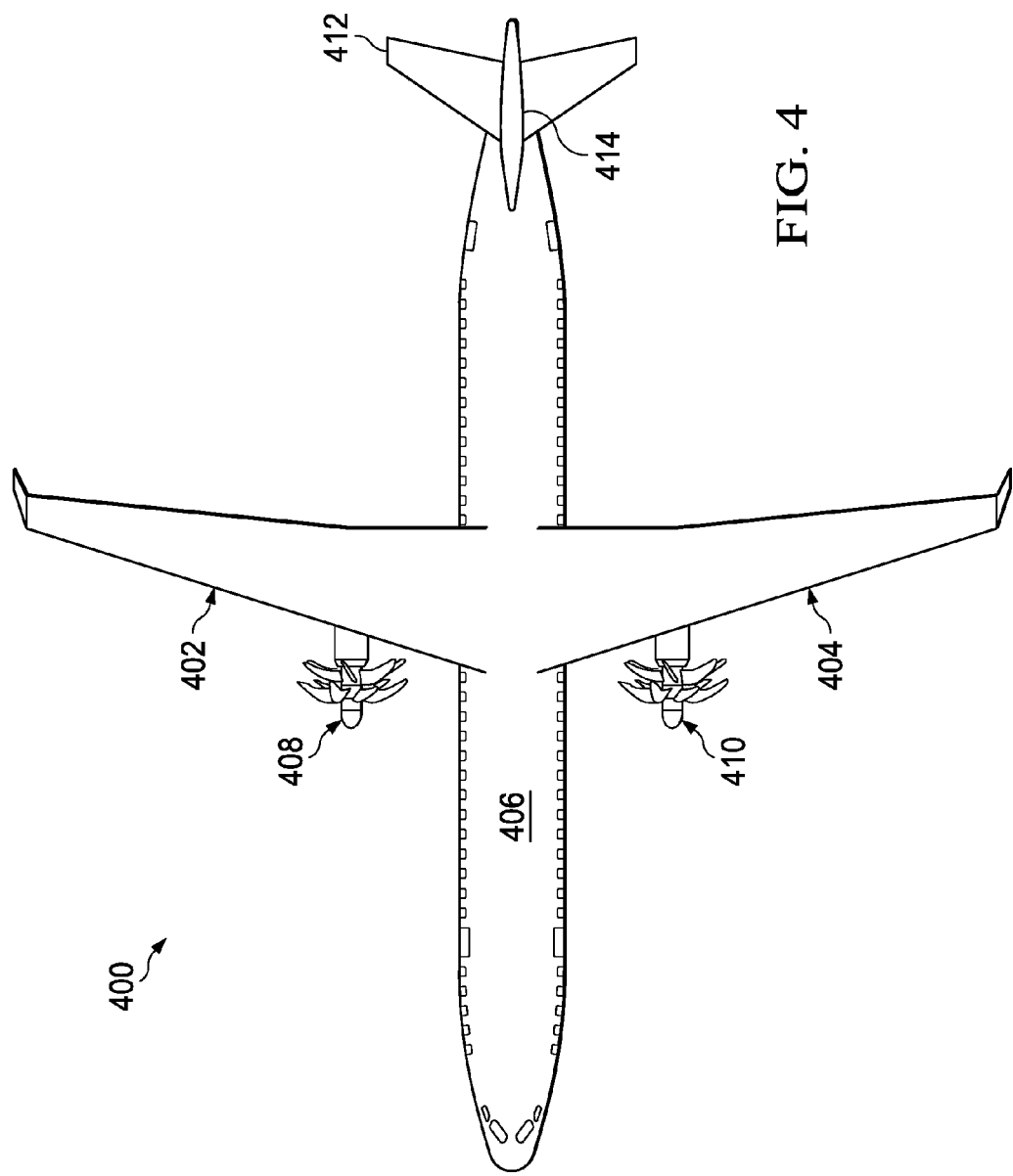
FIG. 4 is an illustration of a top view of an aircraft in which an advantageous embodiment may be implemented.

Turning now to FIG. 4, an illustration of a top view of an aircraft in which an advantageous embodiment may be implemented is depicted. Aircraft 400 may be implemented as aircraft 200 in FIG. 2. In this illustrative example, aircraft 400 has wings 402 and 404 attached to fuselage 406. Aircraft 400 also may include engine 408, wing engine 410, horizontal stabilizer 412 and vertical stabilizer 414.

In the advantageous embodiment described herein, engines 408 and 410 may be contra-rotation open fan (CROF) engines. It should be understood, however, that this is intended to be exemplary only, as advantageous embodiments may also include other types of engines, for example and without limitation, engines having one propeller disc or "single rotation open fan (SROF) engines. Also, it should be understood that advantageous embodiments may be utilized on different types of aircraft, be utilized on engines mounted at different locations on the aircraft and be utilized on aircraft having one or more engines.

Figure 5:
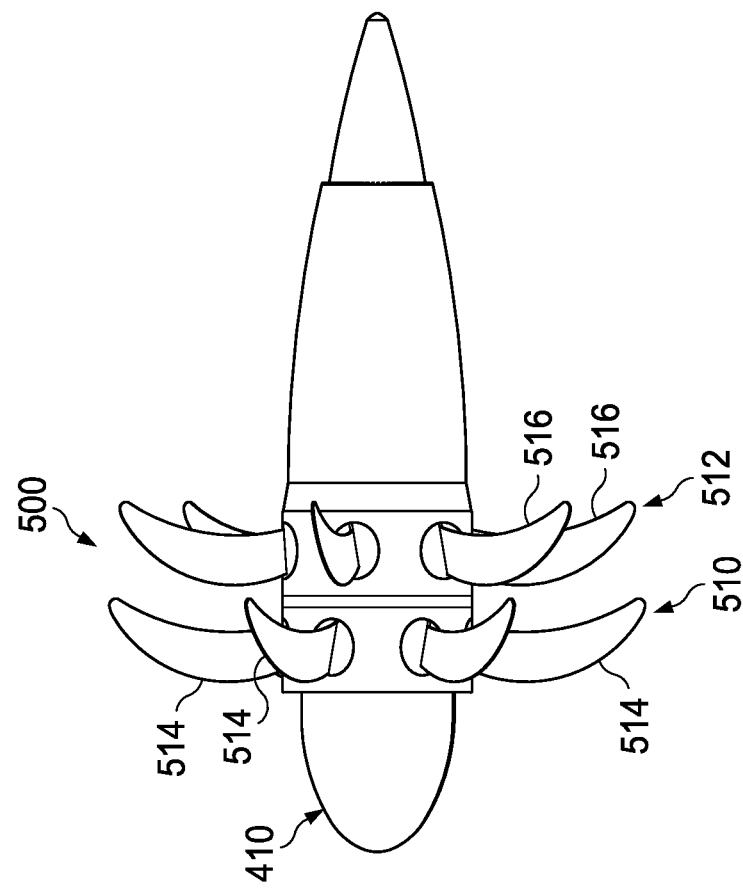
FIG. 5 is an illustration of a side view of an engine of the aircraft illustrated in FIG. 4.

Turning now to FIG. 5, an illustration of a side view of an engine of the aircraft illustrated in FIG. 4 is depicted. In particular, FIG. 5 illustrates wing mounted engine 410 depicted in FIG. 4 in greater detail. Engine 410 is a CROF aircraft engine and has a CROF propeller system 500 having two contra-rotating propellers 510 and 512. Propeller 510 is usually referred to herein as "upstream" propeller 510, and propeller 512 is usually referred to herein as "downstream" propeller 512. Upstream propeller 510 has a plurality of upstream propeller blades 514, and downstream propeller 512 has a plurality of downstream propeller blades 516. In the advantageous embodiment described herein, each propeller 510 and 512 may have six propeller blades equally spaced therearound although it should be understood that this is intended to be exemplary only as the propellers may have any desired number of propeller blades.

The propeller blades 516 of downstream propeller 512 of CROF propeller system 500 may require "cropping" during aircraft takeoff and climb in order to reduce community noise (the term "takeoff and climb" as used herein refers to the period from when an aircraft starts moving down a runway until the aircraft reaches a typical cruising speed and altitude, for example, Mach 0.8 and 35,000 feet).

Figure 6A:
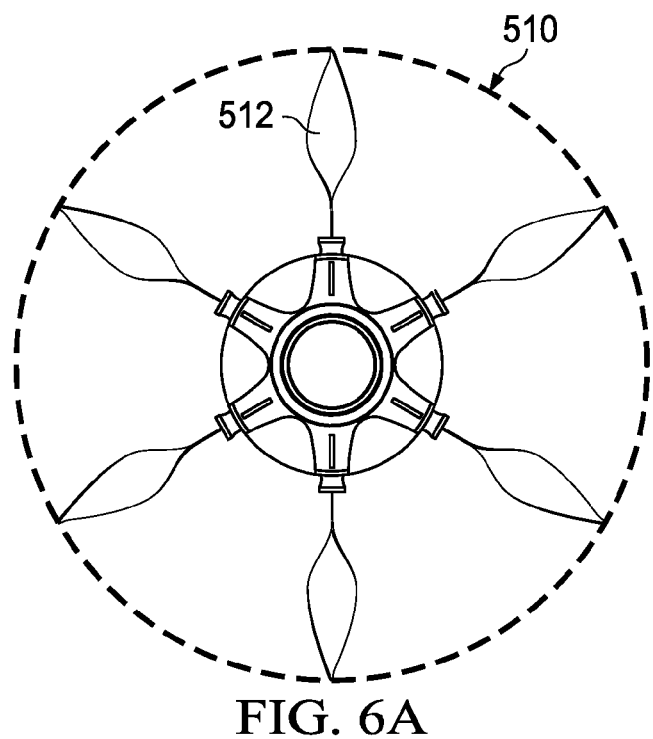
FIGS. 6A and 6B are illustrations that schematically depict the relative positions of upstream and downstream propellers and propeller blades, respectively, of a contra-rotation open fan propeller system of an aircraft without cropping of the downstream propeller blades to assist in explaining advantageous embodiments.
Figure 6B:
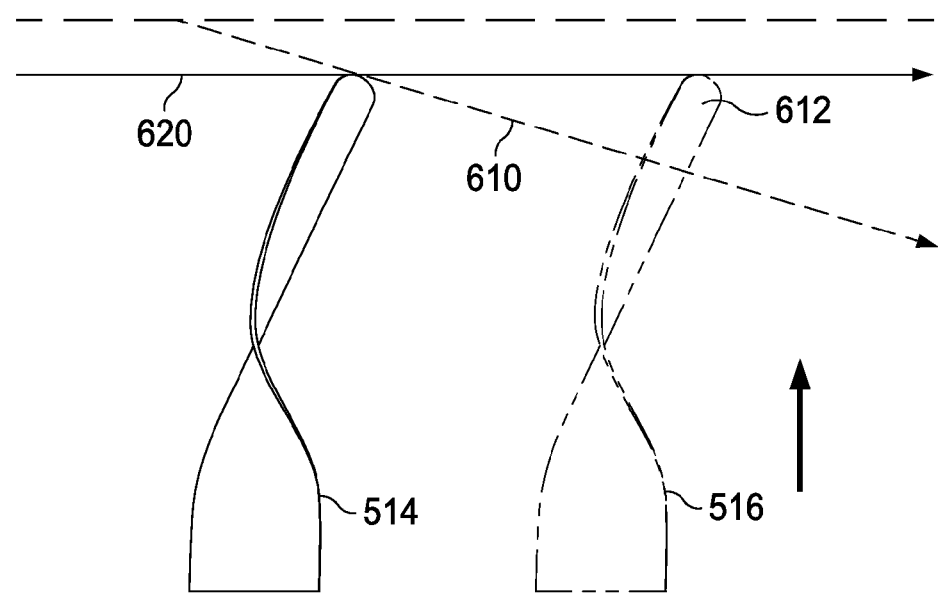
Figure 6C:
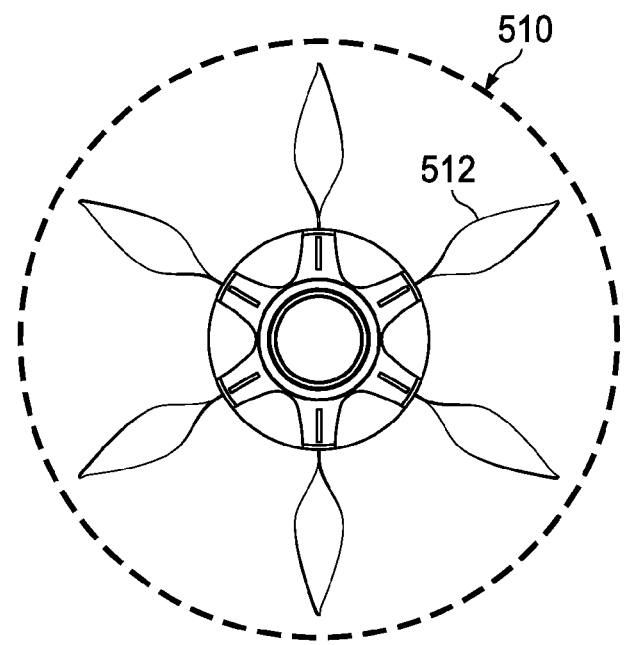
FIGS. 6C and 6D are illustrations that schematically depict the relative positions of upstream and downstream propellers and propeller blades, respectively, of a contra-rotation open fan propeller system of an aircraft with cropping of the downstream propeller blades to assist in explaining advantageous embodiments.
Figure 6D:
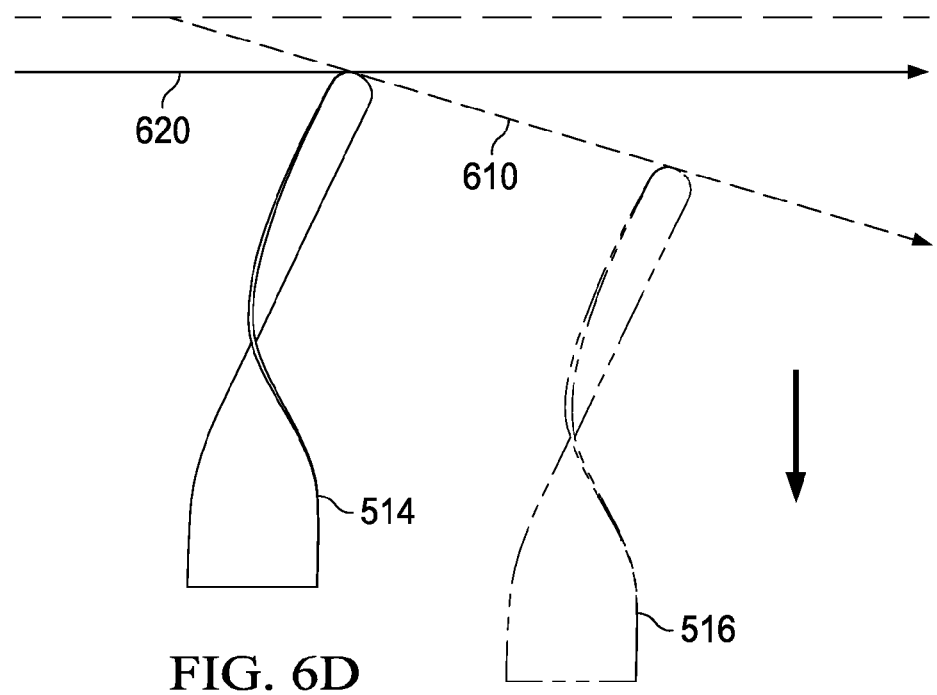

FIGS. 6A and 6B are illustrations that schematically depict the relative positions of upstream and downstream propellers and propeller blades, respectively, of a contra-rotation open fan propeller system of an aircraft without cropping of the downstream propeller blades; and FIGS. 6C and 6D are illustrations that schematically depict the relative positions of upstream and downstream propellers and propeller blades, respectively, of a contra-rotation open fan propeller system of an aircraft with cropping of the downstream propeller blades to assist in explaining advantageous embodiments.

When an aircraft is traveling at a relatively slow speed, for example, during a takeoff and climb operation, if the upstream propeller blades 514 and the downstream propeller blades 516 are of the same length, as shown in FIG. 6B, such that the upstream propeller 510 and the downstream propeller 512 have the same diameter, as shown in FIG. 6A, excessive community noise may be caused by wake interaction and Blade Vortex Interaction (BVI) noise. BVI noise is caused by the fact that tip vortices created by the upstream propeller tend to decay in a radial inward direction toward the downstream propeller as the stream tube contracts (the contraction angles are a function of flight Mach number and flight angle) in such a way that the vortex path, illustrated by dashed line 610 in FIGS. 6B and 6D is "chopped" (i.e., interacted with) by the downstream propeller blades 516 as schematically illustrated at 612 in FIG. 6B, at typically the most highly loaded region of the propeller blades. As the downstream propeller chops these vortices, inherent blade-passage tone levels increase and new interaction tones are created.

As shown in FIGS. 6C and 6D, in order to reduce community noise during takeoff, therefore, the downstream propeller blades 516 may be "cropped" such that the diameter of downstream propeller 512 is less than the diameter of upstream propeller 510 by an amount sufficient such that the downstream propeller blades 516 do not extend into the vortex path 610 as shown in FIG. 6D.

On the other hand, as also shown in FIG. 6B, during normal cruising speed, for example, at Mach 0.8, the contraction of the stream tube is nearly absent as shown by solid line 620. Accordingly, the downstream propeller blades will no longer extend into the vortex path and downstream propeller 512 may be of substantially the same diameter as the upstream propeller 510 without causing unacceptable community noise while providing maximum performance.

Although a reduction in the diameter of the downstream propeller relative to the diameter of the upstream propeller enables a reduction in community noise during a takeoff and climb operation, this reduction in diameter may also result in a reduction in propeller aerodynamic efficiency, and thus propulsive efficiency, and increased fuel consumption for the aircraft. Unfortunately, this fuel burn penalty is generally accepted for an entire flight mission even though the most noise-sensitive portion of the takeoff and climb operation may only last several minutes.

In accordance with an advantageous embodiment, an apparatus and method for controlling a propeller is provided that optimizes the position of the downstream propeller of a contra-rotation open fan propeller system during all flight conditions. According to an advantageous embodiment, a CROF engine for an aircraft has a CROF propeller system in which the length of the propeller blades of the downstream propeller are set to be at a first retracted length such that the diameter of the downstream propeller is less than the diameter of the upstream propeller during a takeoff and climb operation in order to reduce community noise, and are gradually extended in length to a second extended length as the speed of the aircraft increases during the takeoff and climb operation, until the diameter of the downstream propeller is substantially equal to the diameter of the upstream propeller at a cruising speed for the aircraft. By controlling the diameter of the downstream propeller in this manner, effective noise reduction is achieved during the takeoff and climb operation, and aircraft flight efficiency is maintained at cruising speed.

Turning now to FIG. 7, an illustration of a side perspective view of the propeller system of the contra-rotation open fan engine illustrated in FIG. 5 is depicted in accordance with an advantageous embodiment. As shown in FIG. 7, CROF propeller system 500 may have an upstream propeller housing 702 from which upstream propeller blades 514 of upstream propeller 510 extend, and a downstream propeller housing 704 from which downstream propeller blades 516 of downstream propeller 512 extend. As is known to those skilled in the art, upstream propeller housing 702 and downstream propeller housing 704 are rotatable in opposite directions to rotate upstream and downstream propellers 510 and 512 in opposite directions during operation of CROF propeller system 500.

As indicated previously, propeller blades 514 of upstream propeller 510 may be of a fixed length such that upstream propeller 510 is of a fixed diameter, for example and without limitation, 12-14 feet. The propeller blades 516 of downstream propeller 512, however, may have a variable length such that the diameter of downstream propeller 512 may have a variable diameter. In accordance with an advantageous embodiment, the propeller blades 516 of downstream propeller 512 are "cropped" to have a first retracted length during a takeoff and climb operation of an aircraft such that the diameter of the downstream propeller 512 is less than the diameter of the upstream propeller 510 during at least a portion of the takeoff and climb operation; and are gradually increased in length as the speed of the aircraft increases until the propeller blades of the downstream propeller are at a second extended length that is substantially equal to the fixed length of the propeller blades of the upstream propeller such that the diameter of the downstream propeller is substantially equal to the fixed diameter of the upstream propeller at cruising speed.

Figure 8:
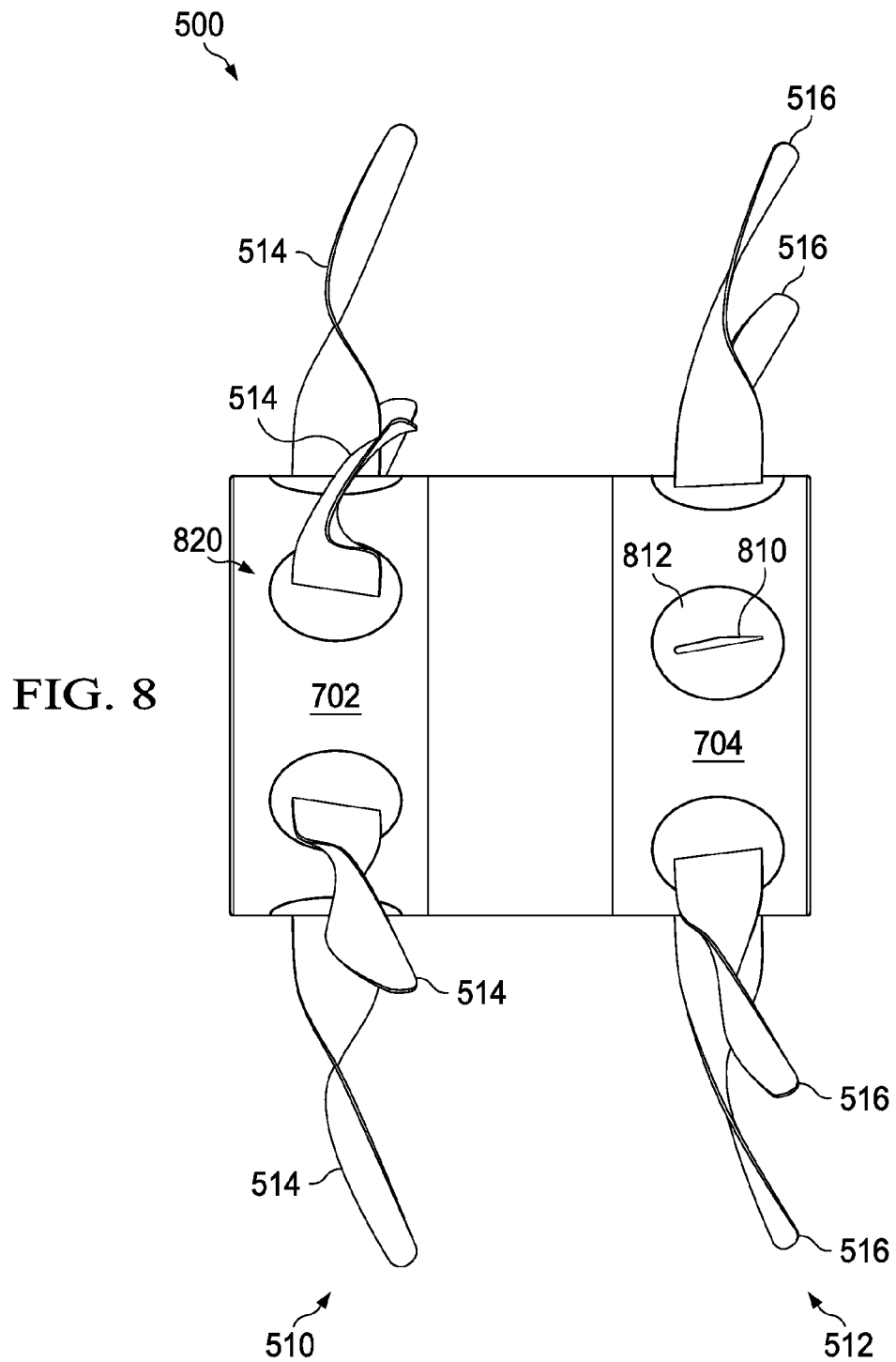
FIG. 8 is an illustration of a side perspective view of the propeller system illustrated in FIG. 7 with a downstream propeller blade removed to illustrate features of the propeller system in accordance with an advantageous embodiment.

Turning now to FIG. 8, an illustration of a side perspective view of the CROF propeller system illustrated in FIG. 7 is depicted with a propeller blade of the downstream propeller removed to illustrate features of the propeller system in accordance with an advantageous embodiment. In particular, as shown in FIG. 8, each downstream propeller blade 516 extends through a slot 810 in a generally circular-shaped plate 812 in sidewall of downstream propeller housing 704. As will be explained hereinafter, each circular-shaped plate 812 is incorporated in a pitch control system of a downstream propeller blade actuator system, and is rotatable to, in turn, rotate the propeller blades 516 of the downstream propeller 512 to provide pitch control. Upstream propeller blades 514 may also include a pitch control mechanism 820, which may be of conventional type, to provide pitch control of propeller blades 514 of upstream propeller 510.

Figure 9:
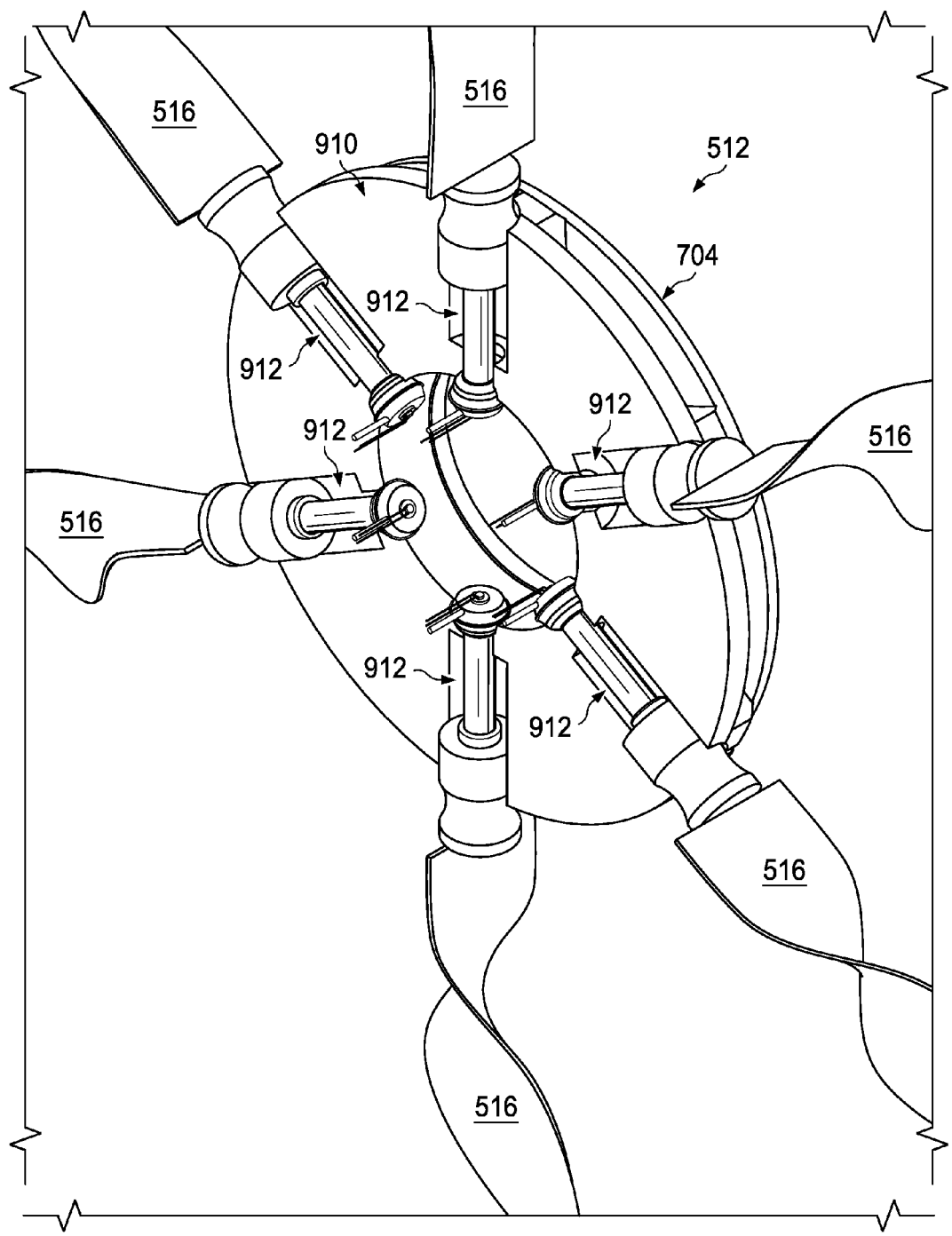
FIG. 9 is an illustration of the interior of the downstream propeller housing of the propeller system illustrated in FIG. 7 to show a blade actuator system in accordance with an advantageous embodiment.
Figure 10:
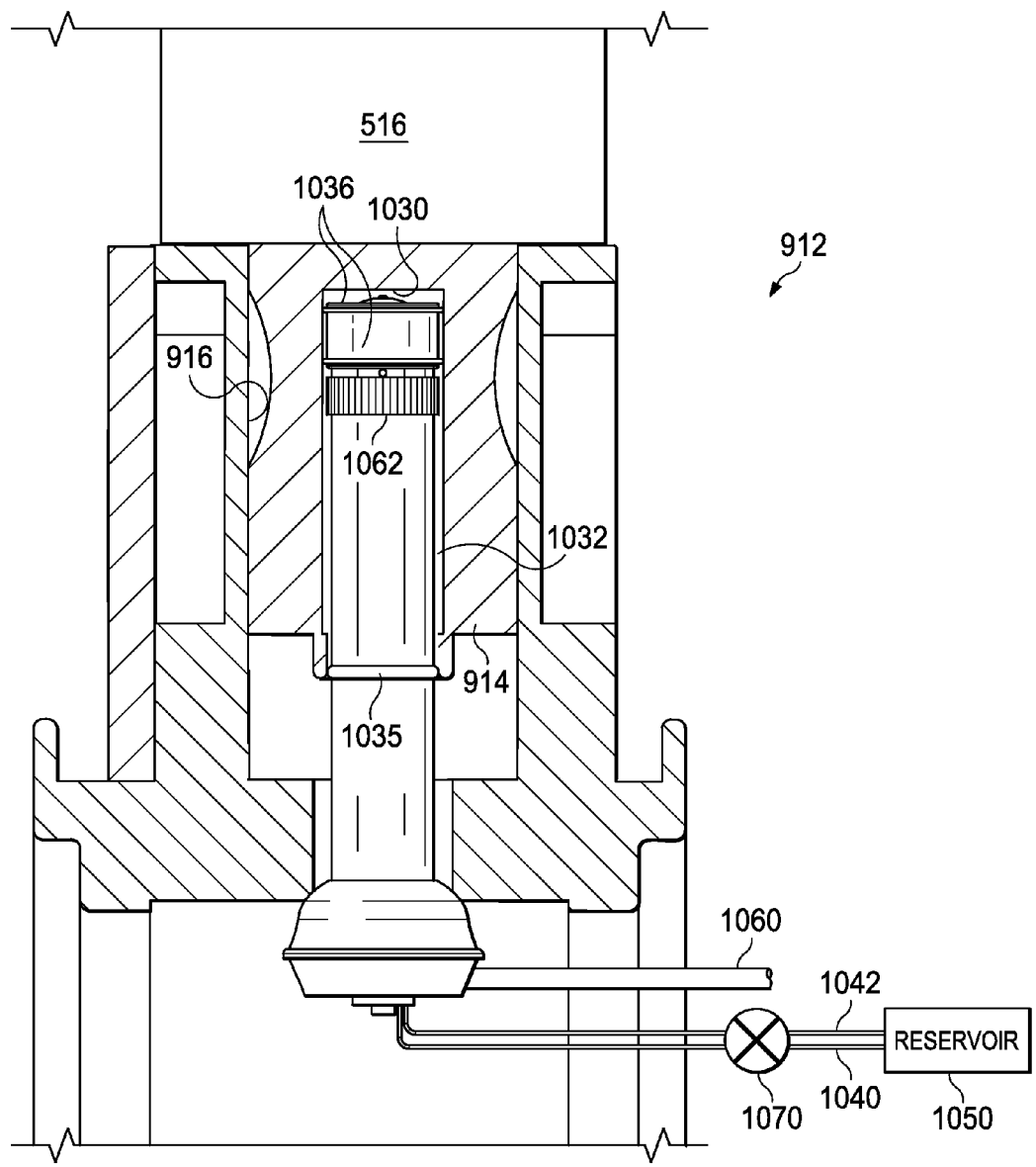
FIG. 10 is an illustration of a side view of a blade actuator of the blade actuator system illustrated in FIG. 9.
Figure 11:
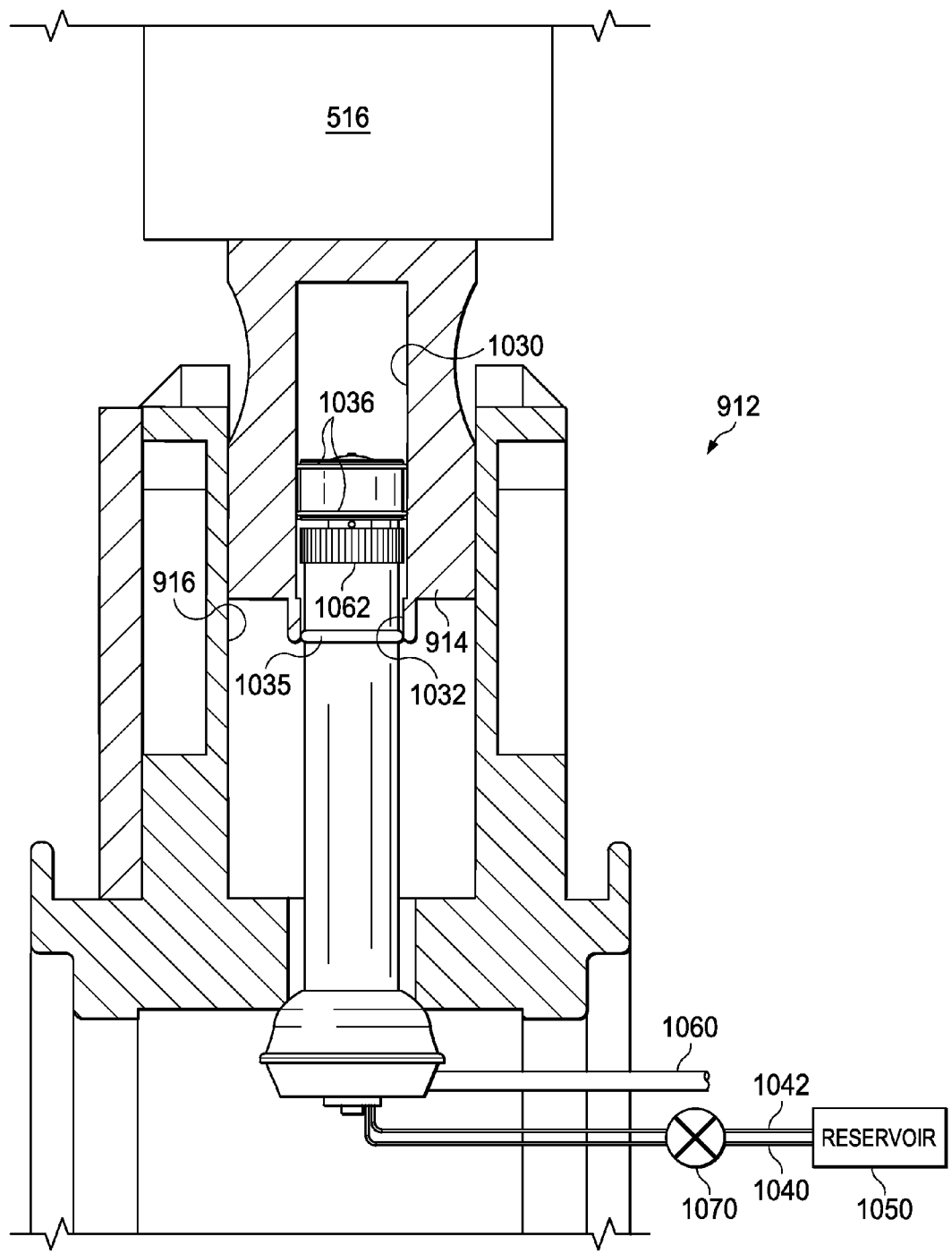
FIG. 11 is an illustration of a side view of the blade actuator illustrated in FIG. 10 with a moveable member of the blade actuator in an extended position in accordance with an advantageous embodiment.

With reference now to FIGS. 9-11, FIG. 9 is an illustration that depicts the interior of the downstream propeller housing of the propeller system illustrated in FIG. 7 to show a blade actuator system in accordance with an advantageous embodiment, and FIGS. 10 and 11 are illustrations that depict side views of a blade actuator of the blade actuator system illustrated in FIG. 9.

As shown in FIG. 9, the downstream propeller housing 704 of downstream propeller 512 may have a downstream propeller blade actuator system 910 for controlling the length of downstream propeller blades 516 to control the diameter of downstream propeller 512. More particularly, downstream propeller blade actuator system 910 may have a plurality of blade actuators 912 (schematically illustrated in FIG. 9), each blade actuator 912 for controlling/adjusting the length of a different one of downstream propeller blades 516.

As shown in FIGS. 10 and 11, each blade actuator 912 may have a moveable member 914, for example, a piston, which is attached to a downstream propeller blade 516. Each moveable member 914 is moveable within cylinder 916 between a first retracted position and a second extended position. FIG. 10 depicts moveable member 914 in the first retracted position in cylinder 916, and FIG. 11 depicts moveable member 914 in the second extended position in cylinder 916.

When each moveable member 914 is in the first retracted position as illustrated in FIG. 10, each downstream propeller blade 516 is at the first retracted length which is less than the length of the fixed length of the upstream propeller blades such that the diameter of downstream propeller 512 is less than the diameter of the upstream propeller 510. On the other hand, when the moveable member 914 is at the second extended position as illustrated in FIG. 11, the downstream propeller blades 516 are at the second extended length which is substantially the same as the length of the upstream propeller blades 514 such that the diameter of the downstream propeller 512 is substantially the same as the diameter of the upstream propeller 510.

In accordance with an advantageous embodiment, the moveable member 914 of each blade actuator 912 is driven between the first retracted position and the second extended position by hydraulic pressure. In particular, hydraulic fluid may be fed to and removed from chambers 1030 and 1032 via tubes 1040 and 1042, respectfully, in blade actuators 912, as illustrated in FIGS. 10 and 11. Tubes 1040 and 1042 are connected to a common hydraulic fluid reservoir schematically illustrated at 1050 in FIGS. 10 and 11. The hydraulic fluid reservoir 1050, in turn, may be supplied from the aircraft's hydraulic system illustrated at 212 in FIG. 2, or from another hydraulic fluid source. Chambers 1030 and 1032 are maintained in a fluid tight condition by O-rings 1035 and 1036.

In accordance with an advantageous embodiment, hydraulic fluid from reservoir 1050 under pressure may be fed into chamber 1030 of each blade actuator 912 via tube 1040 to fill chamber 1030 to move the moveable member 914 to the second extended position shown in FIG. 11 to, in turn, move the downstream propeller blade 516 attached to the moveable member 914 at the second extended length. In a similar manner, hydraulic fluid from reservoir 1050 may be fed into chamber 1032 of each blade actuator 912 via tube 1042 to fill chamber 1032 to move the moveable member 914 to the first retracted position to, in turn, move the downstream propeller blade 516 to the first retracted length. In accordance with an advantageous embodiment, when hydraulic fluid is fed into one of chambers 1030 or 1032, the hydraulic fluid is concurrently removed from the other chamber to smoothly extend and retract the moveable member 914 as needed.

As will be explained hereinafter, the moveable members 914 may be positioned at the first retracted position prior to takeoff of an aircraft, for example, after the aircraft has landed following a previous flight. As will also be explained hereinafter, after initial takeoff of the aircraft, the hydraulic fluid is gradually fed into chamber 1030 and gradually bled from chamber 1032 and returned to reservoir 1050 causing the moveable member 914 to gradually move upwardly in cylinder 916 until the moveable member reaches the second extended position illustrated in FIG. 11.

In particular, as the speed of the aircraft increases during takeoff and climb, and the blade-vortex path/stream tube described with reference to FIGS. 6A-6D expands, the hydraulic pressure in chamber 1030 is gradually increased and the hydraulic pressure in chamber 1032 is gradually bled out causing the moveable member 914 to move outwardly in cylinder 916, in turn causing the propeller blade 516 to gradually increase in length. The hydraulic pressure is continued to be increased in chamber 1030 until the moveable member 914 is at the second extended position and the propeller blade carried thereby is at the second extended length.

FIGS. 10 and 11 also illustrate a tube 1060 that is connected to blade actuator 912. As will be explained hereinafter, tube 1060 carries a linkage system (not shown) for rotating gear 1062 to, in turn, rotate moveable member 914 and the propeller blade 516 attached thereto to provide pitch control. Also, hydraulic lines 1040 and 1042 preferably include a hydraulic supply valve, schematically indicated at 1070 to control the direction of the supply pressure to chambers 1030 and 1032 and, in case of an emergency situation, to enable quick release of all hydraulic pressure, for example, from ground service or from an auxiliary power unit.

Figure 12:
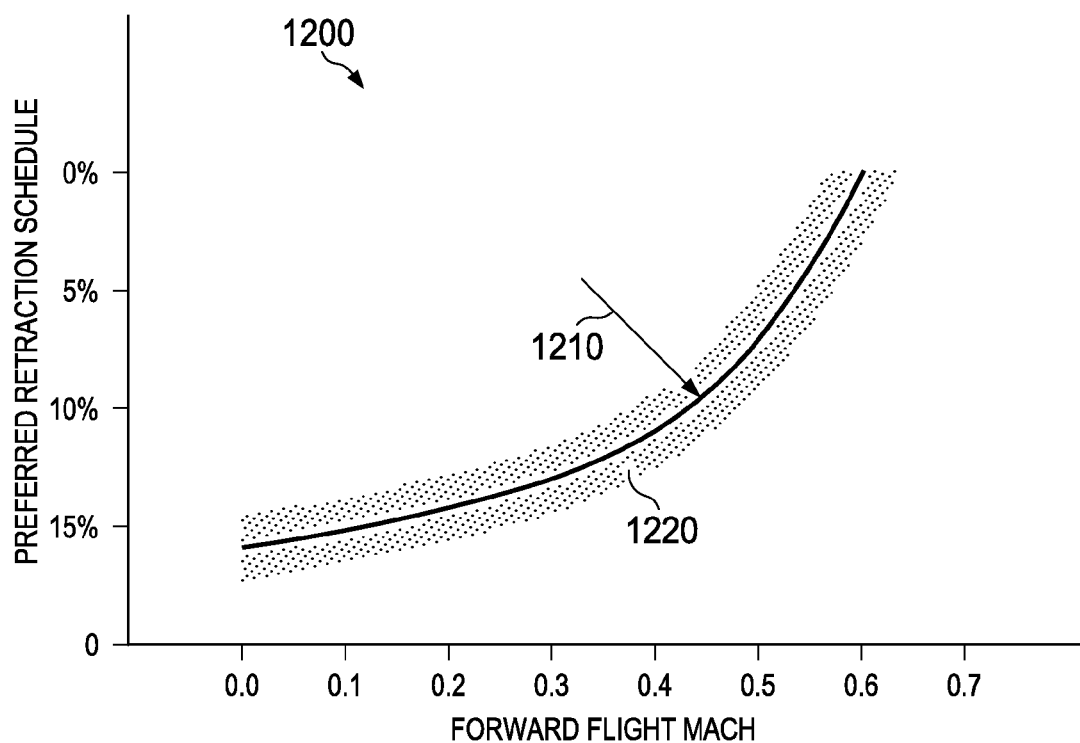
FIG. 12 is an illustration of a graph showing an exemplary retraction schedule for the downstream propeller blades of a contra-rotation open fan engine in accordance with an advantageous embodiment.

With reference now to FIG. 12, an illustration of a graph is depicted showing an exemplary retraction schedule for the downstream propeller blades of a CROF engine in accordance with an advantageous embodiment. The graph is generally designated by reference number 1200 and curve 1210 thereon represents an exemplary retraction schedule as a function of forward flight Mach number.

As shown in FIG. 12, at a forward speed of zero, the downstream propeller blades are cropped such that the diameter of the downstream propeller is typically between 15 and 25 percent less than that of the upstream propeller. As the forward flight Mach number of the aircraft increases during takeoff and climb, the downstream propeller blades are gradually extended (lengthened) until they reach a second extended length at an aircraft speed of about Mach 0.6. At this time, the downstream propeller blades and the upstream propeller blades are at substantially the same length and the diameters of the upstream propeller and the downstream propeller are also about the same.

The shaded area 1220 in FIG. 12, on either side of curve 1210, represents an operational tolerance band to allow for acceptable schedule deviation due to but not limited to angle of attack, based on logic governed by the aircraft's FMS.

It should be understood that curve 1210 illustrated in FIG. 12 is intended to be exemplary only of a retraction schedule as other retraction schedules may also be followed. It may be desirable, however, to select a retraction schedule that maximizes efficiency of the aircraft. In this regard, FIG. 13 is an illustration of a graph that depicts the effect of cropping on aircraft efficiency and noise.

Figure 13:
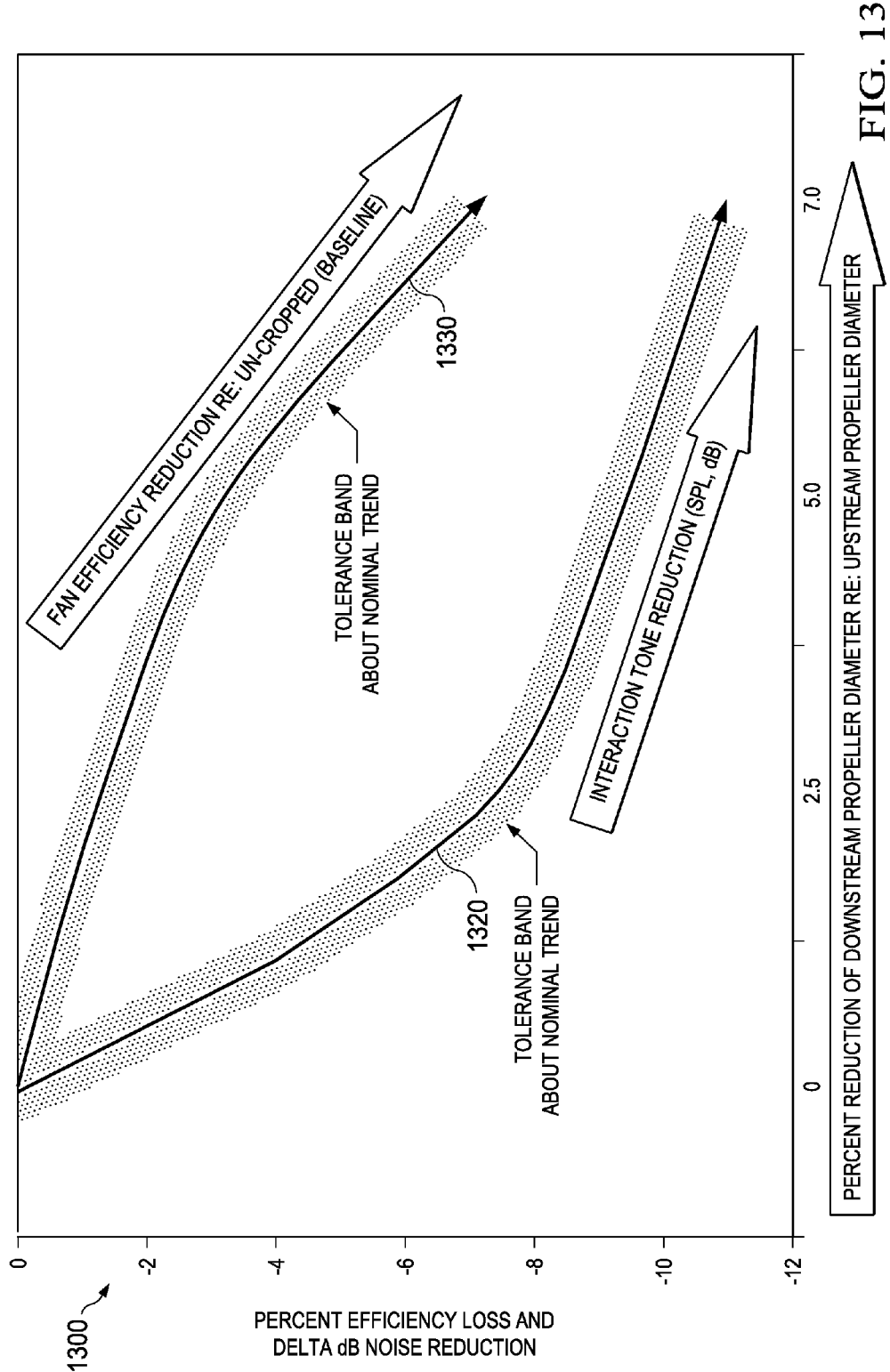
FIG. 13 is an illustration of a graph that depicts an exemplary relationship of the percent of cropping/diameter reduction of the downstream propeller of a contra-rotation open fan engine and the percent efficiency loss and Delta dB noise ratio.

In particular, FIG. 13 is an illustration of a graph showing an exemplary relationship of the percent of cropping/diameter reduction of the downstream propeller of a contra-rotation open fan engine and the percent efficiency loss and Delta dB noise ratio. The graph is generally designated by reference number 1300, and at the beginning of a takeoff and climb operation, wherein the downstream propeller blades are cropped such that the diameter of the downstream propeller is between ten and twenty percent less than the diameter of the upstream propeller, delta noise reduction, shown by curve 1320, is greater than ten percent and efficiency loss, indicated by curve 1330, is about five percent. As the amount of cropping of the downstream propeller blades is gradually reduced, however, the efficiency loss and the Delta noise reduction gradually decreases until at cruising speed, both efficiency loss and noise reduction is at zero. As indicated in FIG. 13, the shaded areas on either side of curves 1320 and 1330 represent a tolerance band about nominal trend.

As can be clearly seen from FIG. 13, by gradually increasing the length of the downstream propeller blades (i.e., the span or diameter of the downstream propeller), aircraft operating efficiency also gradually increases during the segment resulting in a reduction in fuel required for the mission.

As the downstream propeller blades are gradually extended in length during takeoff and climb of an aircraft, it is desirable that all the blades move in unison such that the length of all the blades of the downstream propeller are the same at all times to avoid imbalance issues. As described previously, the movement of each downstream propeller blade may be controlled by a hydraulic actuator, with each hydraulic actuator being connected to a common reservoir to help ensure that the downstream propeller blades move in unison. In accordance with an advantageous embodiment, however, a blade equalizer system may be provided to further ensure that the downstream propeller blades move in unison and are always of the same length in the event of hydraulic creep or hydraulic failure in any part of the system or within an individual blade actuator. Furthermore, s beneficial feature of this advantageous embodiment pertains to engine-out scenarios. In the event any one of the airplane engines loses power, the downstream propeller diameter of the other engine(s) should be immediately increased to provide an incremental increase in thrust. Operationally, this would either be initiated when the pilot triggers the "toga" (take-off and go around) button; or automatically if the airplane flight computers are equipped with engine failure detection capabilities. In this case, it is expected that the hydraulic fluid will be drained very fast, which makes the blade equalizer system very important.

Figure 14:
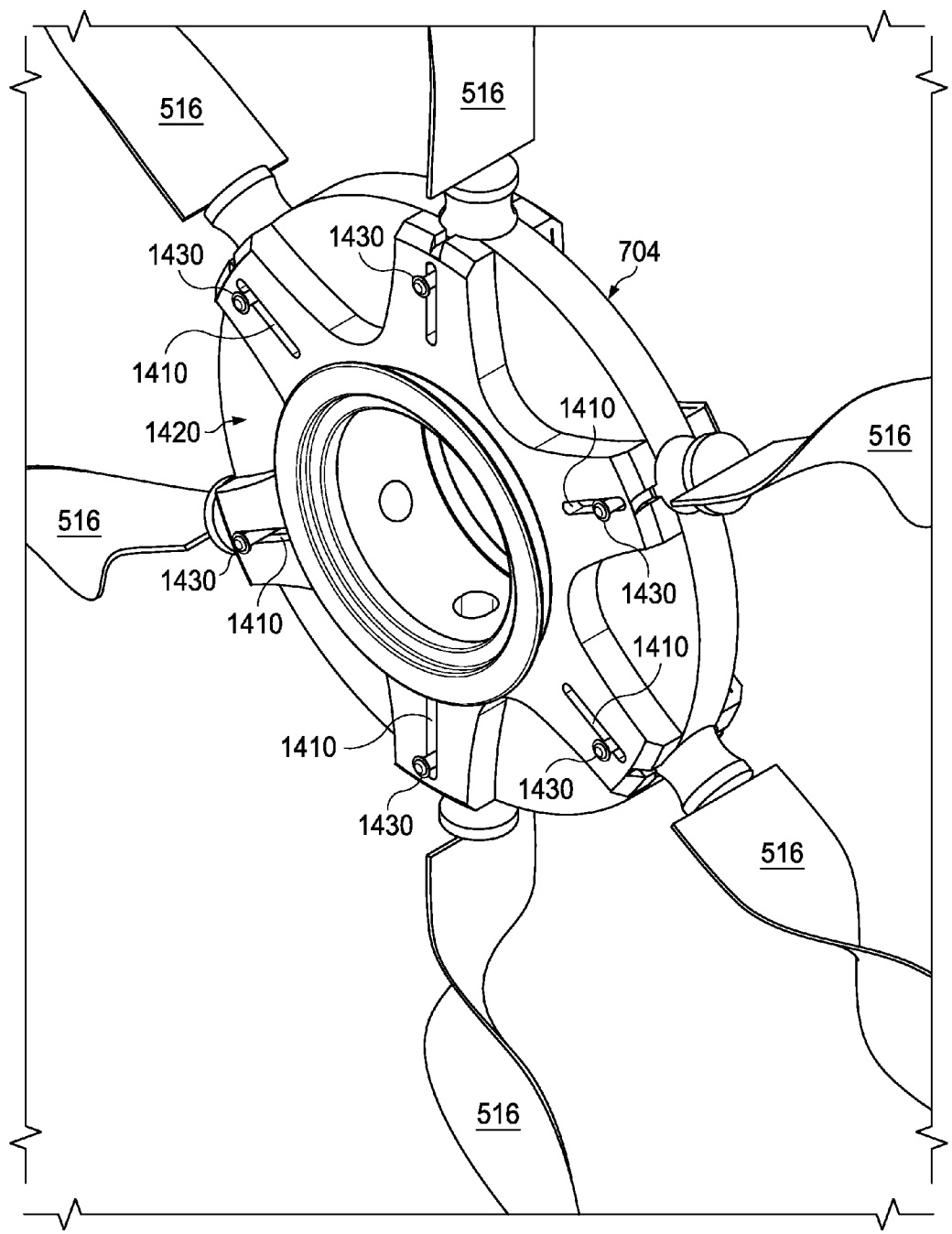
FIG. 14 is an illustration of a perspective view of the downstream propeller housing of the contra-rotation open fan engine illustrated in FIG. 7 with a housing cover plate removed to show features of a blade equalizer system in accordance with an advantageous embodiment.
Figure 15:
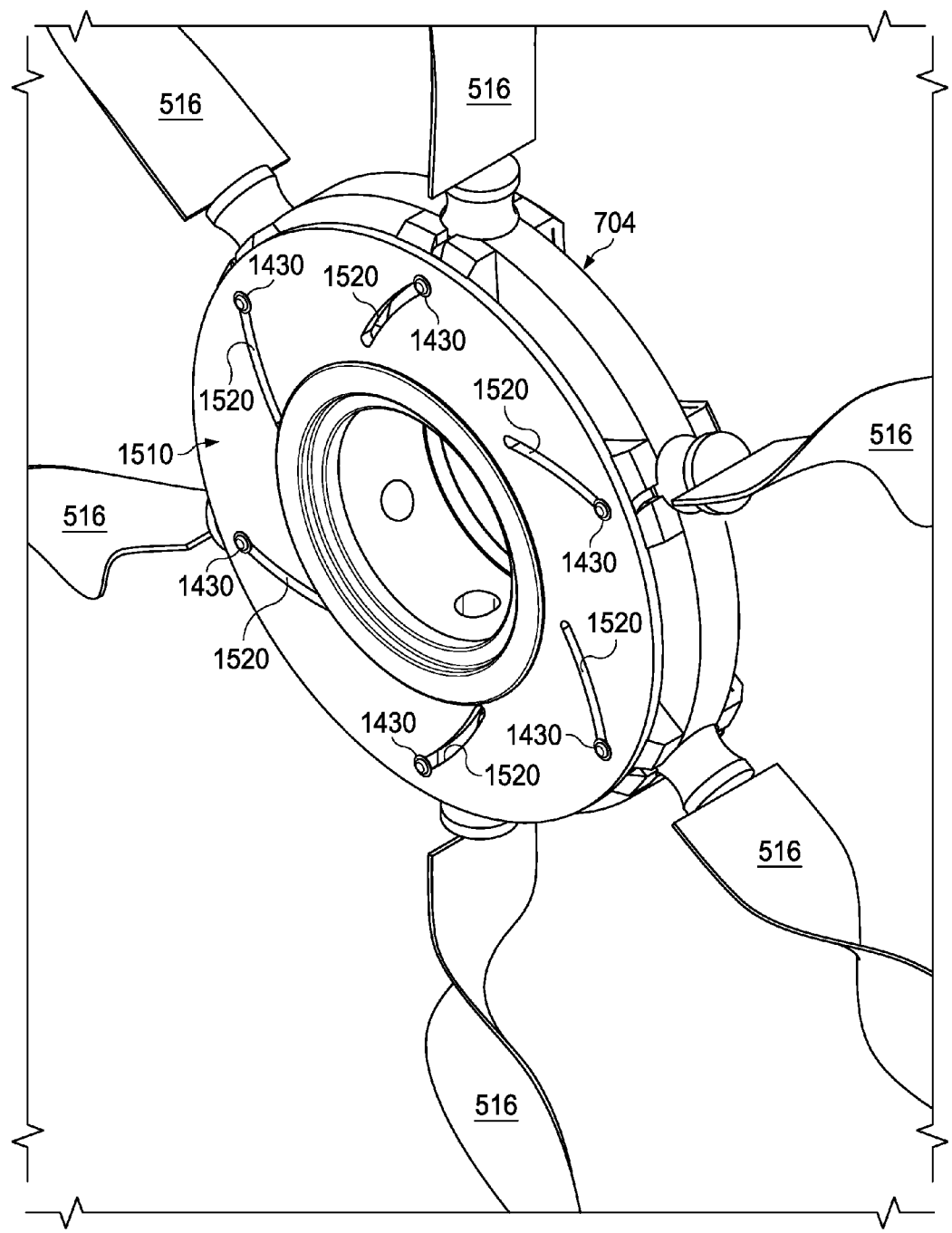
FIG. 15 is an illustration of a perspective view of the downstream propeller housing illustrated in FIG. 14 with a housing cover plate attached to the housing in accordance with an advantageous embodiment.
Figure 16:
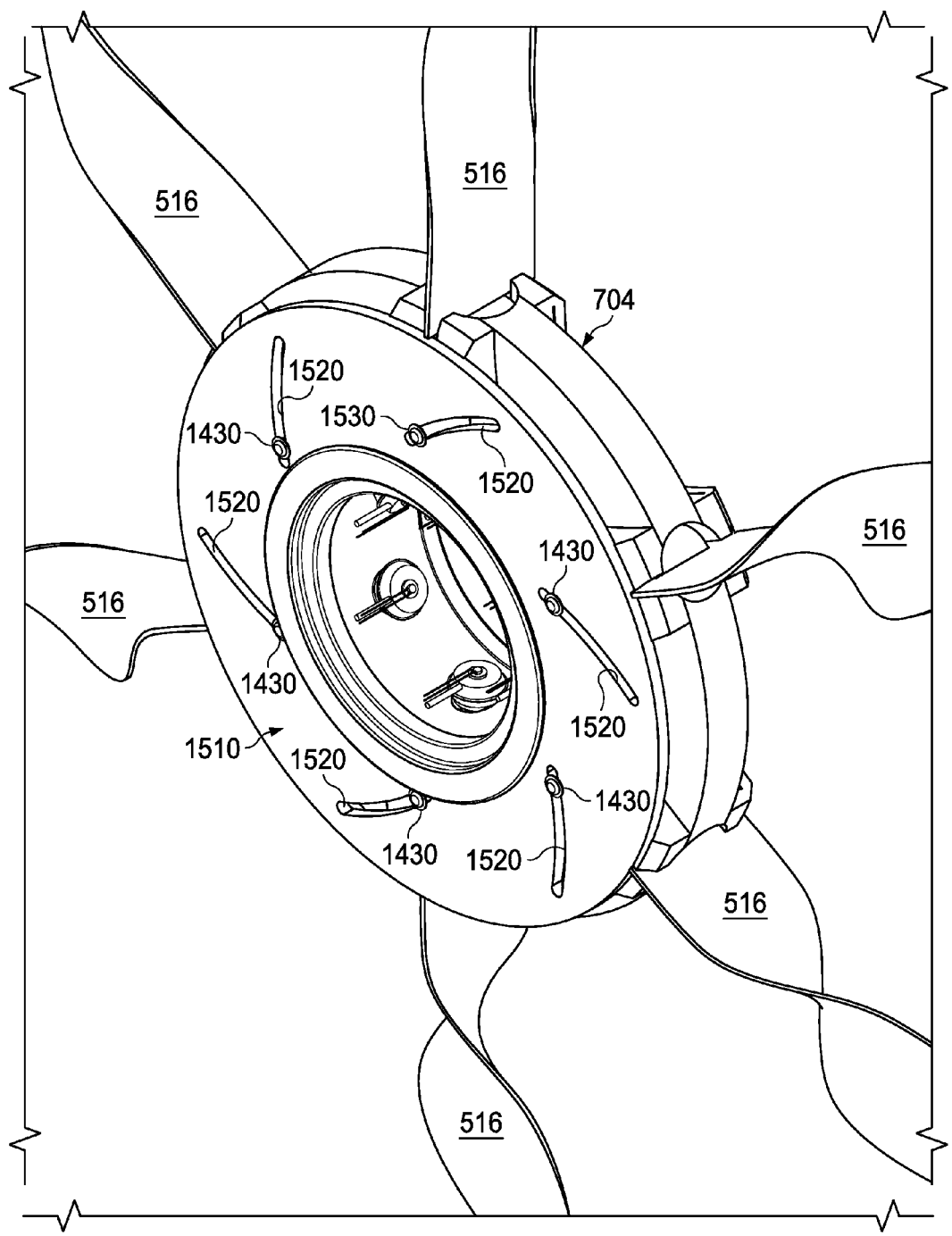
FIG. 16 is an illustration of a perspective view of the downstream propeller housing illustrated in FIG. 15 with the downstream propeller blades at a first retracted length in accordance with an advantageous embodiment.

With reference now to FIGS. 14-16, an illustration of a blade equalizer system for ensuring uniform movement of the downstream propeller blades is depicted in accordance with an advantageous embodiment. In particular, FIG. 14 is an illustration of a perspective view of the downstream propeller housing of the contra-rotation open fan engine illustrated in FIG. 7 with a housing cover plate removed to show features of a blade equalizer system in accordance with an advantageous embodiment. As shown, downstream propeller housing 704 includes a plurality of radial slots 1410 in outer wall 1420 thereof (outer wall 1420 is also sometimes referred to herein as a first plate of the blade equalizer system). A guide pin 1430 that is attached to the moveable member 914 of each blade actuator 912, and that moves with the moveable member 914, extends through an associated one of the radial slots 1410. FIG. 14 illustrates the position of pins 1430 when the downstream propeller blades 516 are at the second extended length.

FIG. 15 is an illustration of a perspective view of the downstream propeller housing illustrated in FIG. 14 with a housing cover plate attached to the housing in accordance with an advantageous embodiment. In particular, cover plate 1510 (sometimes referred to herein as a second plate of the blade equalizer system) includes a plurality of spiral curved slots 1520 positioned above the radial slots 1410 in housing outer wall 1420 such that pins 1430 also extend through the spiral curved slots 1520 of the cover plate 1510. In particular, as the blade actuators 912 move to extend the length of downstream propeller blades 516 from the first retracted length to the second extended length, the pins 1430 move along spiral curved slots 1520 in cover plate 1510 as well as along the radial slots 1410 in housing wall 1420. FIG. 15 illustrates the positions of the pins 1430 when the propeller blades 516 are at the second extended length, and FIG. 16 is an illustration of a perspective view of the downstream propeller housing illustrated in FIG. 15 with the downstream propeller blades at a first retracted length in accordance with an advantageous embodiment.

Figure 17:
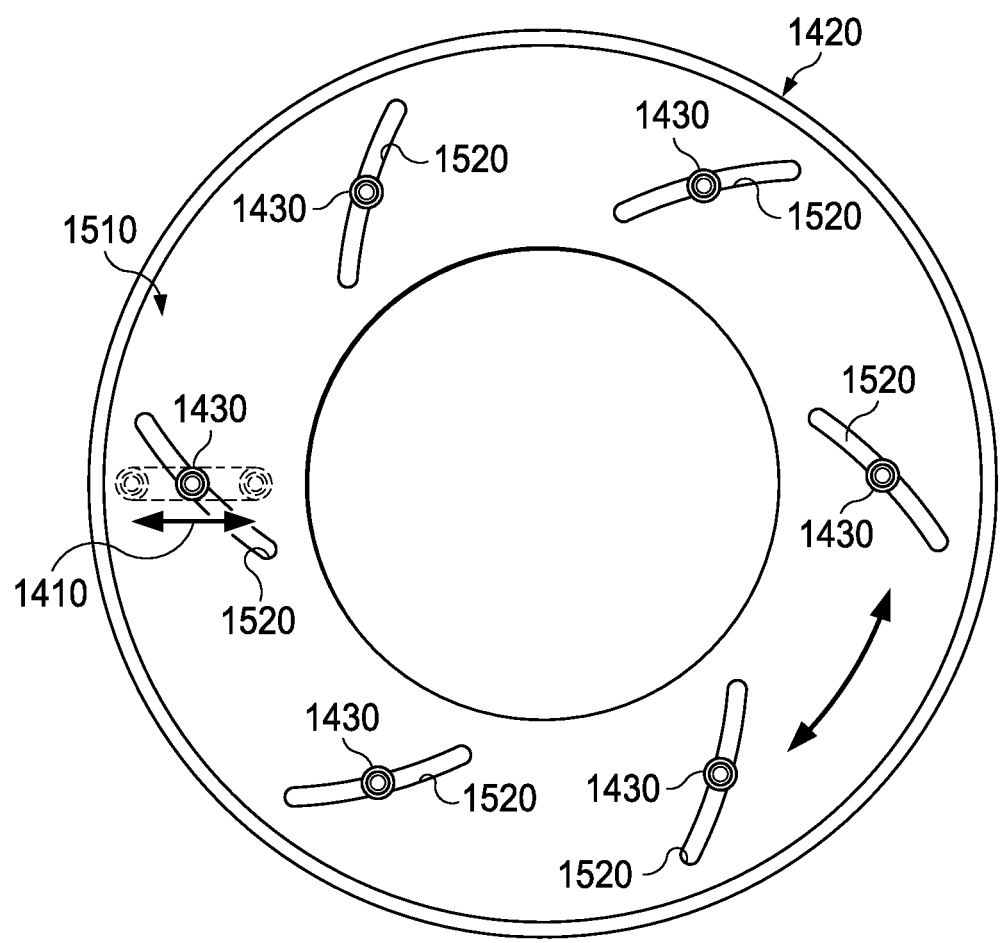
FIG. 17 is an illustration that schematically depicts the operation of the blade equalizer system illustrated in FIGS. 14-16 in accordance with an advantageous embodiment.

FIG. 17 is an illustration of a diagram that schematically depicts the operation of the blade equalizer system illustrated in FIGS. 14-16 in accordance with an advantageous embodiment. For any rotation of cover plate 1510, there will be only one location at which the pin 1430 in each spiral curved slot can be contained. Accordingly, the downstream propeller blades 516 will always be at the same length, and any hydraulic creep or failure of an individual blade actuator is eliminated as long as the two plates 1420 and 1510 are intact and locked relative to each other.

A CROF engine may have a pitch control system to control the angle of pitch of the upstream and downstream propeller blades. In accordance with an advantageous embodiment, the downstream propeller blade actuator system 910 may include a pitch control system for adjusting the pitch of the downstream propeller blades. In particular, as described with reference to FIG. 8, each downstream propeller blade 516 extends through a slot 810 in a generally circular-shaped plate 812 in sidewall 814 of downstream propeller housing 704. Each circular-shaped plate is associated with a blade actuator 912 of blade actuator system 910, and may be rotated by its respective blade actuator 910 to, in turn; rotate the downstream propeller blade 516 attached to the blade actuator to provide pitch control. Specifically, the moveable member 914 of each blade actuator 912 can be rotated by rotating gear 1062 illustrated in FIGS. 10 and 11 via the linkage system extending through tube 1060 attached to each blade actuator 912 to precisely control the pitch of the blades.

Turning now to FIG. 18, an illustration of a flowchart of a process for controlling a propeller in an aircraft engine of an aircraft is depicted in accordance with an advantageous embodiment. The process is generally designated by reference number 1800, and may be implemented in a CROF engine such as CROF engine 300 illustrated in FIG. 3 or CROF engine 408 or 410 illustrated in FIG. 4, although it should be understood that it is not intended to limit advantageous embodiments to a CROF engine as advantageous embodiments may be used with other engines including single propeller engines. When implemented in a CROF engine, the operations of the process may be with respect to a downstream propeller of the CROF engine.

The process may begin by setting the diameter of a propeller of the CROF engine to be at a first diameter during at least a portion of a first flight condition of the aircraft (operation 1810). In accordance with advantageous embodiments, the first flight condition may, for example and without limitation, be a takeoff flight condition, a climb flight condition, a cruise flight condition, a descent flight condition, an altitude flight condition or a forward speed flight condition. The diameter of the propeller is then set to be at a second diameter, different than the first diameter, during at least a portion of a second flight condition of the aircraft (operation 1820). In accordance with advantageous embodiments, the second flight condition may, for example and without limitation, be a takeoff flight condition, a climb flight condition, a cruise flight condition, a descent flight condition, an altitude flight condition or a forward speed flight condition.

FIG. 19 is an illustration of a flowchart of a process for controlling a propeller in an aircraft engine of an aircraft in accordance with an advantageous embodiment. The process is generally designated by reference number 1900, and may be implemented in a CROF engine such as CROF engine 300 illustrated in FIG. 3, or one of CROF engines 408 or 410 illustrated in FIG. 4, although it should be understood that it is not intended to limit advantageous embodiments to a CROF engine as advantageous embodiments may be used with other engines including single propeller engines. When implemented in a CROF engine, the operations of the process may be with respect to a downstream propeller of the CROF engine.

The process may begin by operating a blade actuator system to set propeller blades of a propeller at a first retracted length prior to a takeoff and climb operation of an aircraft (operation 1910). In an advantageous embodiment, for example, the operation may be performed upon landing of the aircraft at the conclusion of a prior flight. After the propeller blades have been set at the first retracted length, operation of the blade actuator system is stopped (operation 1920), such that at the beginning of a takeoff and climb operation of the aircraft, the propeller blades will be at the first retracted length.

Following beginning of a takeoff and climb operation of the aircraft, operation of the blade actuator system is initiated to start increasing the length of the propeller blades in association with the takeoff and climb operation (operation 1930). This operation may be started, for example, when the aircraft reaches a typical take-off speed, for example and without limitation, a speed of Mach 0.3. At this time also, operation of an equalizer system that ensures that the blades lengthen uniformly and are always the same length may be initiated (operation 1940).

Operating of the blade actuator system is continued during at least a portion of the takeoff and climb operation to continue increasing the length of the propeller blades (operation 1950). In accordance with an advantageous embodiment, the propeller blades may be lengthened as a function of an increase in the speed of the aircraft during the takeoff and climb operation.

When the length of the propeller blades are at a second extended length, operation of the blade actuator system is stopped (operation 1960). In a CROF engine, for example, the second extended length may be a length at which the downstream propeller blades are substantially the same length as the upstream propeller blades. The second extended length may be reached, for example, when the speed of the aircraft reaches at or near a cruising speed, for example, Mach 0.8.

A pitch control system, which may be incorporated in the blade actuator system, may be operated to control the pitch of the propeller blades, if desired (operation 1970), and the operation ends.

The description of the different advantageous embodiments has been presented for purposes of illustration and description, and is not intended to be exhaustive or limited to the embodiments in the form disclosed. Many modifications and variations will be apparent to those of ordinary skill in the art. For example, although described primarily in connection with a CROF aircraft engine, advantageous embodiments may be implemented in engines having only a single propeller. In this regard, single rotation propellers can have a very large diameter which may cause ground clearance issues. Advantageous embodiments may be used to reduce the diameter of such propellers while the aircraft is on the ground and during both takeoff and landing, and to increase the diameter of the propeller during flight to optimize efficiency of the aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a propeller of a contra-rotation open fan (CROF) engine of an aircraft, comprising:
   setting a diameter of a downstream propeller of the CROF engine to be at a first diameter during at least a portion of a first flight condition of the aircraft; and
   setting the diameter of the downstream propeller to be at a second diameter, different from the first diameter, during at least a portion of a second flight condition of the aircraft, wherein setting is accomplished using hydraulic force.

2. The method of claim 1, wherein the first flight condition comprises a take-off and climb flight condition, and wherein setting the diameter of the downstream propeller to be at the first diameter during the at least a portion of the first flight condition of the aircraft comprises:
   setting the diameter of the downstream propeller to be at a first retracted diameter that is less than a diameter of an upstream propeller of the CROF engine during at least a portion of the take-off and climb flight condition.

3. The method of claim 2, wherein the second flight condition comprises a cruising flight condition, and wherein setting the diameter of the downstream propeller to be at the second diameter, different from the first diameter, during the at least a portion of the second flight condition of the aircraft, comprises:
   setting the diameter of the downstream propeller to be at a second extended diameter that is substantially equal to the diameter of the upstream propeller of the CROF engine during at least a portion of the cruising flight condition.

4. The method of claim 3, wherein setting the diameter of the downstream propeller to be at the second extended diameter that is substantially equal to the diameter of the upstream propeller of the CROF engine during the at least a portion of the cruising flight condition, comprises:
   increasing the diameter of the downstream propeller during the at least a portion of the takeoff and climb flight condition.

5. The method of claim 4, wherein increasing the diameter of the downstream propeller during the at least a portion of the takeoff and climb flight condition comprises:
   increasing the diameter of the downstream propeller as a function of a speed of the aircraft during the at least a portion of the takeoff and climb flight condition.

6. The method of claim 4, wherein the downstream propeller comprises a plurality of propeller blades, and wherein:
   setting a diameter of the downstream propeller to be at the first retracted diameter comprises setting a length of each propeller blade of the plurality of propeller blades to be at a first retracted length; and
   increasing the diameter of the downstream propeller during the at least a portion of the takeoff and climb flight condition comprises increasing the length of each propeller blade of the plurality of propeller blades during the at least a portion of the takeoff and climb flight condition.

7. The method according to claim 6 further comprising:
   equalizing the increasing of the length of each propeller blade of the plurality of propeller blades such that the length of each propeller blade of the plurality of propeller blades increases in length in unison and each propeller blade of the plurality of propeller blades are always at substantially the same length.

8. The method of claim 2, wherein setting the diameter of the downstream propeller to be at the first retracted diameter comprises:

setting the diameter of the downstream propeller at the first retracted diameter prior to the takeoff and climb flight condition.

9. The method according to claim 1 further comprising:

adjusting a pitch of the propeller blade.

10. The method of claim 1, wherein the first diameter is from about 5% to about 20% less than the diameter of an upstream propeller, and wherein the second diameter is substantially equal to the diameter of the upstream propeller.

11. An apparatus, comprising:

a contra-rotation open fan (CROF) engine having a plurality of propellers; and a hydraulic actuator for setting a diameter of a downstream propeller of the plurality of propellers at a first diameter during at least a portion of a first flight condition of an aircraft, and for setting the diameter of the propeller to be at a second diameter, different from the first diameter, during at least a portion of a second flight condition of the aircraft.

12. The apparatus of claim 11, wherein the first flight condition comprises a take off and climb flight condition, and wherein the first diameter comprises a first retracted diameter that is less than a diameter of an upstream propeller of the CROF engine.

13. The apparatus of claim 12, wherein the second flight condition comprises a cruising flight condition, and wherein the second diameter comprises a second extended diameter that is substantially equal to the diameter of the upstream propeller of the CROF engine.

14. The apparatus of claim 13, wherein the actuator setting the diameter of the downstream propeller to be at the second diameter, different from the first diameter, during the at least a portion of the second flight condition of the aircraft, comprises:

the actuator increasing the diameter of the downstream propeller during at least a portion of the takeoff and climb flight condition.

15. The apparatus of claim 14, wherein the actuator increasing the diameter of the downstream propeller during the at least a portion of the takeoff and climb flight condition, comprises:

the actuator increasing the diameter of the downstream propeller as a function of a speed of the aircraft during the at least a portion of the takeoff and climb flight condition.

16. The apparatus of claim 11, wherein the downstream propeller comprises a plurality of propeller blades, and wherein the actuator comprises a plurality of blade actuators, each blade actuator of the plurality of blade actuators controlling a length of a propeller blade of the plurality of propeller blades from a first retracted length to a second extended length.

17. The apparatus of claim 16 further comprising:

a blade equalizer for ensuring that the length of each propeller blade of the plurality of propeller blades increases in length in unison and that each propeller blade of the plurality of propeller blades are always at substantially the same length.

18. The apparatus of claim 17, wherein the blade equalizer comprises:

a first plate having a plurality of lateral slots;

a second plate having a plurality of spiral curved slots aligned with the plurality of lateral slots to form a plurality of aligned slots; and a pin connected to each blade actuator and extending through a respective one of the plurality of aligned slots.

19. The apparatus of claim 16 further comprising:

a pitch control system for controlling a pitch of each propeller blade of the plurality of propeller blades.

20. The apparatus of claim 19, wherein the pitch control system comprises a rotatable member connected to each blade actuator of the plurality of blade actuators.

21. The apparatus of claim 11 further comprising:

at least one wing; and a fuselage.

22. The apparatus of claim 11, wherein the first diameter is from about 5% to about 20% less than the diameter of an upstream propeller, and wherein the second diameter is substantially equal to the diameter of the upstream propeller.

23. An apparatus, comprising:

a contra-rotation open fan (CROF) engine having a plurality of propellers;

an actuator configured to set a diameter of a downstream propeller of the plurality of propellers at a first diameter during at least a portion of a first flight condition of an aircraft, and for setting the diameter of the downstream propeller to be at a second diameter, different from the first diameter, during at least a portion of a second flight condition of the aircraft; and a pitch control system configured to adjust a pitch of each propeller blade of the plurality of propeller blades.

24. The apparatus of claim 23, wherein the first diameter is from about 5% to about 20% less than the diameter of an upstream propeller, and wherein the second diameter is substantially equal to the diameter of the upstream propeller.

* * * * *